(12) United States Patent
Tseng et al.

(10) Patent No.: US 8,898,585 B2
(45) Date of Patent: Nov. 25, 2014

(54) ELECTRONIC DEVICE, INPUT METHOD THEREOF, AND COMPUTER-READABLE MEDIUM USING THE METHOD

(75) Inventors: Te-Pei Tseng, Taoyuan County (TW); Huan-Chih Tseng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 506 days.

(21) Appl. No.: 12/703,777

(22) Filed: Feb. 11, 2010

(65) Prior Publication Data

US 2011/0197158 A1 Aug. 11, 2011

(51) Int. Cl.
*G06F 3/048* (2013.01)
*G06F 3/0488* (2013.01)
*G06F 3/041* (2006.01)

(52) U.S. Cl.
CPC .......... *G06F 3/0416* (2013.01); *G06F 3/04886* (2013.01)
USPC .............................. 715/773; 715/771; 715/862

(58) Field of Classification Search
CPC ........................ G06F 3/04886; G06F 3/04883
USPC ................ 715/765, 773, 771, 862, 863, 864; 345/173
See application file for complete search history.

(56) References Cited

U.S. PATENT DOCUMENTS

| | | | | |
|---|---|---|---|---|
| 5,748,512 A | * | 5/1998 | Vargas | 708/142 |
| 6,259,436 B1 | * | 7/2001 | Moon et al. | 345/173 |
| 7,614,008 B2 | * | 11/2009 | Ording | 715/773 |
| 7,900,156 B2 | * | 3/2011 | Andre et al. | 715/773 |
| 7,920,132 B2 | * | 4/2011 | Longe et al. | 345/173 |
| 2009/0309768 A1 | * | 12/2009 | Pihlaja | 341/24 |
| 2011/0167375 A1 | * | 7/2011 | Kocienda | 715/773 |

FOREIGN PATENT DOCUMENTS

WO PCT/US2010/020263 * 1/2010 .............. G06F 3/048

* cited by examiner

*Primary Examiner* — Haoshian Shih
(74) *Attorney, Agent, or Firm* — Jianq Chyun IP Office

(57) ABSTRACT

An electronic device, an input method thereof, and a computer-readable medium using the method are provided, wherein the electronic device has a function key corresponding to a predetermined function. In the method, when a function key input is received, whether the function key input is inputted successively is determined according to a time interval between a reception time of the function key input and a reception time of a previous key input. The electronic device is prohibited from executing the predetermined function relevant to the function key if the function key input is inputted successively.

17 Claims, 5 Drawing Sheets

ELECTRONIC DEVICE, INPUT METHOD THEREOF, AND COMPUTER-READABLE MEDIUM USING THE METHOD

BACKGROUND OF THE APPLICATION

1. Field of the Application

The present application relates to an input method of an electronic device. More particularly, the present application relates to a method of handling unintentional input of an electronic device and applications thereof.

2. Description of Related Art

To get larger screen size, more and more electronic devices are equipped with touch screen to serve as an input device. Without a physical keyboard, when a user has to input words or instructions into the electronic device, a graphical keyboard namely a software input panel (SIP) provided by the electronic device is necessary for the user to accomplish the input operation.

However, the size of the electronic device limits the size of the touch screen, so that the display area of the SIP is limited and the key size of each key in the SIP is relatively small. Therefore, the user often touches an incorrect key during the input operation because of the small key size. Once the user incorrectly touches a key such as a delete key, an expected character is unable to be inputted, moreover, a character which has been inputted correctly will be deleted. In this situation, the user has to input the deleted character once again, and then inputs the following character to accomplish the input operation.

SUMMARY OF THE APPLICATION

The present application is directed to an input method for an electronic device, an electronic device and a computer-readable medium using the method, by which whether a user has inputted a function key unintentionally is determined, and a correcting mechanism is accordingly executed if it is determined that the function key has been inputted unintentionally.

The present application provides an input method for an electronic device, wherein the electronic device has a function key corresponding to a predetermined function. In the method, a function key input is received. Whether the function key input is inputted successively is determined according to a time interval between a reception time of the function key input and a reception time of a previous key input, wherein the previous key input is different from the function key input. The electronic device is prohibited from executing the predetermined function if the function key input is inputted successively.

The present application provides an electronic device with a function key corresponding to a predetermined function. The electronic device comprises an input module, a determining module and an executing module. The input module is configured to receive key inputs. The determining module couples to the input module, wherein the determining module is configured to determine whether a function key input received by the input module is inputted successively according to a time interval between a reception time of the function key input and a reception time of a previous key input, and the previous key input is different from the function key input. The executing module couples to the determining module, wherein the executing module is configured to prohibit the electronic device from executing the predetermined function if the determining module determines the function key input is inputted successively.

The present application further provides a computer-readable medium for storing a computer program, the computer program comprising a plurality of codes used for being loaded into an electronic device and enabling the electronic device to execute the following steps: receiving a function key input, determining whether the function key input is inputted successively or not according to a time interval between a reception time of the function key input and a reception time of a previous key input, and prohibiting the electronic device from executing the predetermined function if the function key input is inputted successively. In which, the previous key input is different from the function key input.

According to the examples of the present application, when the user unintentionally presses a function key during successive key inputs, the electronic device is prohibited from executing the predetermined function of the function key so as to prevent an input error caused by the input of the function key.

In order to make the aforementioned and other features and advantages of the present application comprehensible, several exemplary examples accompanied with figures are described in detail below.

DESCRIPTION

Figure 1:
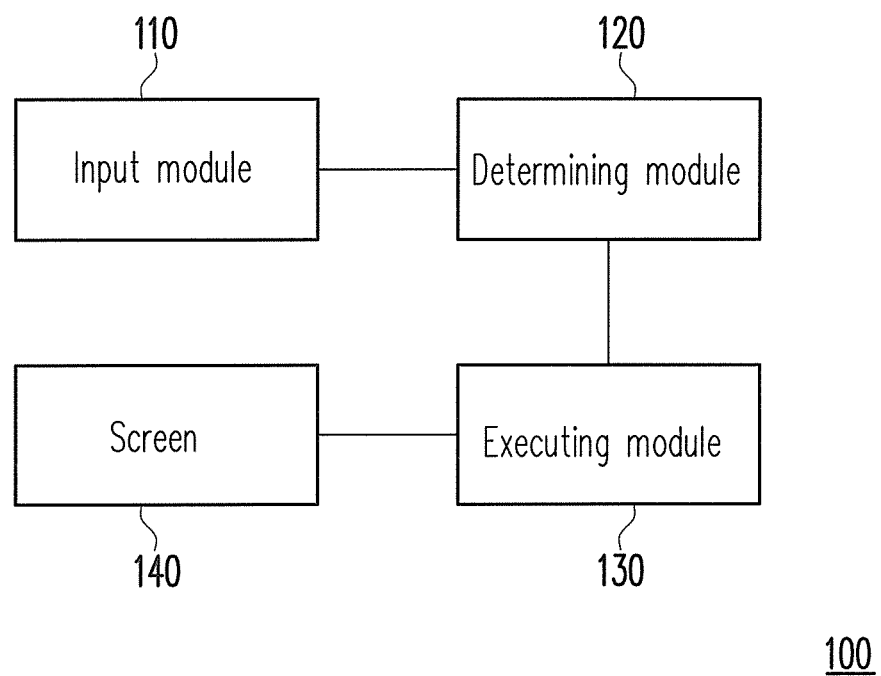
FIG. 1 is a block diagram illustrating an electronic device according to an example of the present application.

FIG. 1 is a block diagram illustrating an electronic device according to an example of the present application. Referring to FIG. 1, the electronic device 100 comprises an input module 110, a determining module 120, an executing module 130, and a screen 140. The electronic device 100 may be a cell phone, a personal digital assistant (PDA), a PDA phone, a smart phone, a computer, a music player, a game console, a digital camera, or any other electronic device having a function key corresponding to a predetermined function.

The input module 110 is configured to provide a software input panel (SIP). Each time when receiving a key input through the SIP, the input module 110 recognizes which key has been pressed by a user of the electronic device 100. In one embodiment, each key on the SIP is corresponding to one input character. In the other embodiment, each key on the SIP may be corresponding to one or more input characters. Besides, each of the input characters is, for example, a letter, a numeral, a phonetic symbol, a punctuation mark, or any symbol. The type of the SIP comprises a standard QWERTY keyboard, a compact QWERTY keyboard, and a phone keypad, etc.

The determining module 120 couples to the input module 110, the determining module 120 may be a hardware (for example, a chipset), a software component, or the combination of a hardware and a software component with calculating and processing capabilities. The determining module 120 is configured to determine an input speed of the user. Accordingly, whether a function key input is inputted successively may be determined by the determining module 120.

The executing module 130 couples to the determining module 120, wherein the executing module 130 may be a hardware (for example, a chipset), a software component, or the combination of a hardware and a software component. The executing module 130 is configured to output a character relevant to the key pressed by the user and/or to execute a function corresponding to the key pressed by the user. In this embodiment, the executing module 130 is controlled to execute or not to execute the predetermined function of the function key according to the determination made by the determining module 120.

The screen 140 couples to the executing module 130, wherein the screen 140 may be a capacitive touch screen or a resistive touch screen, the type of the screen 140 is not limited herein. The screen 140 is used for displaying the execution result generated by the executing module 130.

Figure 2:
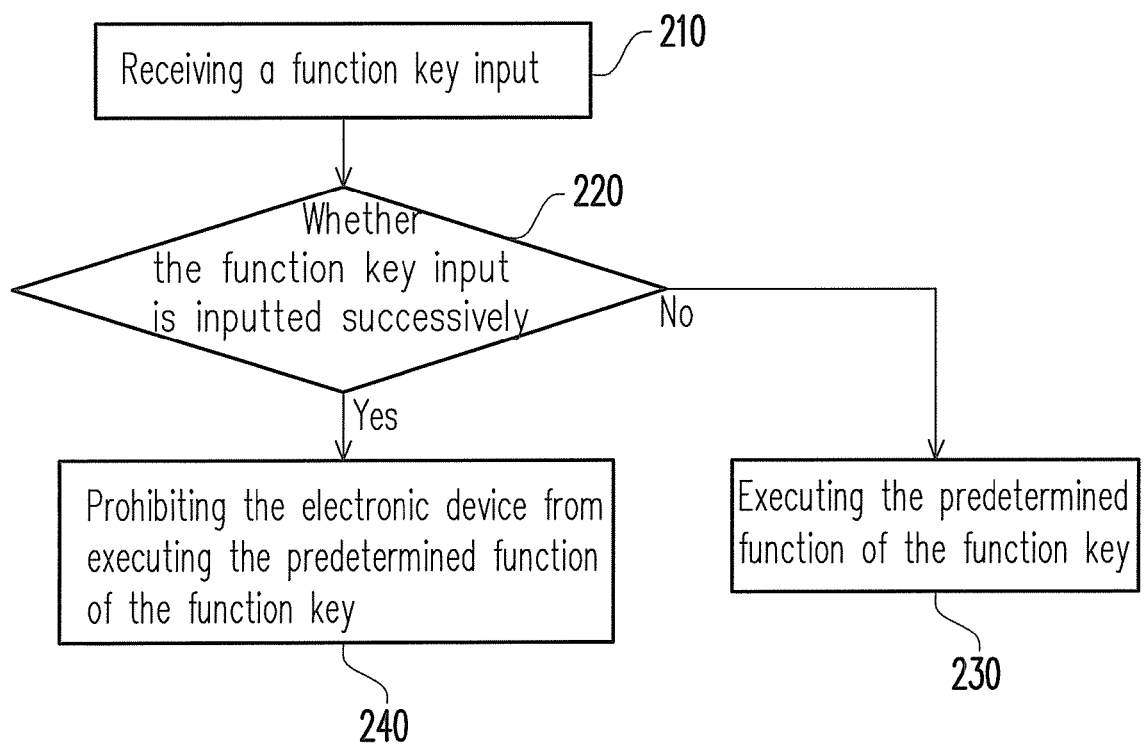
FIG. 2 is a flowchart illustrating an input method for an electronic device according to an example of the present application.

An input method for the electronic device 100 is described in detail with reference of a following flowchart. FIG. 2 is a flowchart illustrating an input method for an electronic device according to an example of the present application. The function key of the electronic device 100 is, for example, a delete key and/or a shift key.

In this embodiment, the predetermined function corresponding to the delete key is deleting characters which have been inputted by the user. The predetermined function corresponding to the shift key is, for example, inputting an uppercase character relevant to the key pressed by the user, or modifying the behavior of the other function keys of the electronic device 100.

Referring to FIG. 2, in step 210, the input module 110 receives a function key input through the SIP. To be specific, when the user touches the SIP, the input module 110 detects location coordinates of a touch point, and determines a pressed key according to the location coordinates and a key layout of the SIP. After comparing a key code of the pressed key with a key code of the function key, the determining module 120 concludes that the key pressed by the user is the function key if the key code of the pressed key is consistent with the key code of the function key.

Taking the delete key as an example of the function key. Generally speaking, when the user realizes that the inputted character is incorrect and planning to use the delete key on the SIP to fix the incorrect character, the input speed of the user will slow down. On the contrary, during a successive input operation, the pressing of the delete key by the user is usually unintentional. Accordingly, whether the pressing of the other function key (e.g. the shift key) is intentional or not may be distinguished in the same way. As a result, in order to determine whether the input of the function key is intentional, in step 220, the determining module 120 determines whether the function key input is inputted successively according to a time interval between a reception time of the function key input and a reception time of a previous key input. In this embodiment, the previous key input is different from the function key input. In other words, the previous key input is not corresponding to any function key of the electronic device 100.

To be specific, the determining module 120 subtracts the reception time of the previous key input from the reception time of the function key input, and then takes a difference between the two reception times as the time interval. After that, the determining module 120 compares the time interval with a time threshold so as to determine whether the function key input is inputted successively.

When the time interval is longer than or equal to the time threshold, the determining module 120 determines that the function key input is not inputted successively. This means the input speed of the user is slowing down during the pressing of the function key indicating that the user means to press the function key. Accordingly in step 230, the determining module 120 controls the executing module 130 to execute the predetermined function of the function key. That is, the electronic device 100 is allowed to execute the predetermined function in this situation.

However, when the time interval is less than the time threshold, the determining module 120 determines that the function key input is inputted successively. This indicates the pressing of the function key is probably unintentional. Therefore in step 240, the determining module 120 controls the executing module 130 to prohibit the electronic device 100 from executing the predetermined function of the function key.

For example, if the pressing of the delete key is determined successive to the previous key input (e.g., last key input of the delete key input), the executing module 130 does not delete any character which has been inputted. Furthermore, if the pressing of the shift key is determined successive to the previous key input (e.g., last key input of the delete key input), the executing module 130 does not execute the predetermined function of the shift key.

In the application, the time interval between the reception time of the function key input and the reception time of a previous key input is used for determining whether the function key input is successive to the previous key input. However, the manner of determining whether the function key input is successive or not is not limited herein. In another embodiment, the determining module 120 calculates a total reception time of receiving a predetermined number of key inputs including the function key input, and determines that the function key input is inputted successively when the total reception time is less than a specific time threshold.

As shown in FIG. 2, when the user presses the function key during successive inputs, the executing module 130 prohibits the electronic device 100 from executing the predetermined function corresponding to the function key. In the following embodiment, a correction mechanism to deal with the unintentional function key input is performed additionally.

Figure 3:
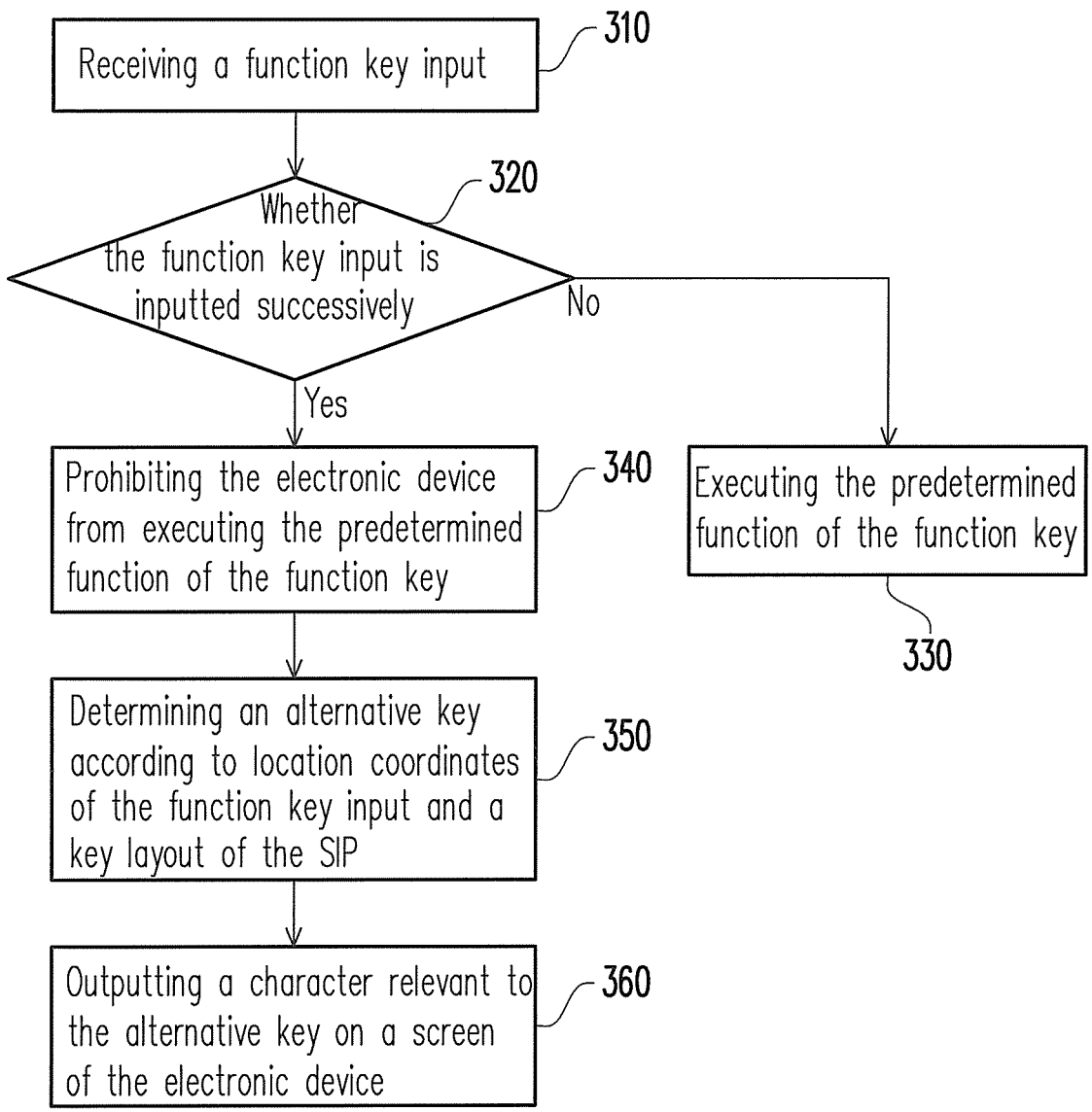
FIG. 3 is a flowchart illustrating an input method for an electronic device according to another example of the present application.

FIG. 3 is a flowchart illustrating an input method for an electronic device according to another example of the present application. Steps 310-340 in FIG. 3 are the same or similar to the steps 210-240 in FIG. 2, and therefore will not be described herein.

In this embodiment, an alternative key will be inputted to make up for the unintentional input of the function key. Referring to step 350, the determining module 120 determines the alternative key according to the touch point of the function key input and a key layout of the SIP. To be specific, the determining module 120 selects the closest character key to the touch point of the function key input as the alternative key. Finally, in step 360, the determining module 120 controls the executing module 130 to output a character relevant to the alternative key on the screen 140 of the electronic device 100.

Figure 4:
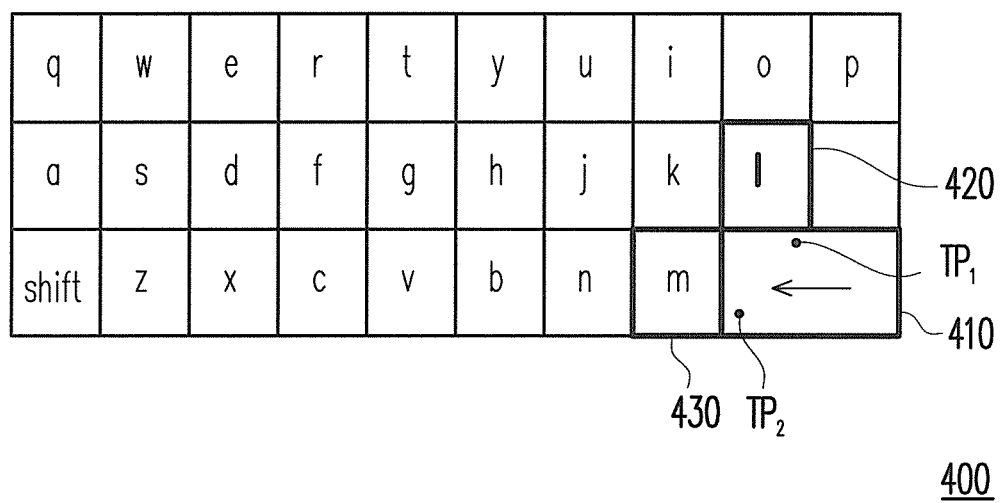
FIG. 4 is a diagram illustrating a layout of a SIP according to an example of the present application.

Taking a SIP 400 shown in FIG. 4 as an example, assuming that the received function key input is corresponding to the delete key 410. When the determining module 120 determines that the function key input is inputted successively and the touch point of the delete key 410 is $TP_1$, since a key 420 is the closest character key to the touch point $TP_1$, the determining module 120 selects the key 420 as the alternative key and controls the executing module 130 to output the character "1" relevant to the key 420 on the screen 140. For another example, when the determining module 120 determines that the function key input is inputted successively and the touch point of the delete key 410 is $TP_2$, since a key 430 is the closest character key to the touch point $TP_2$, the determining module 120 selects the key 430 as the alternative key and controls the executing module 130 to output the character "m" relevant to the key 430 on the screen 140.

Figure 5:
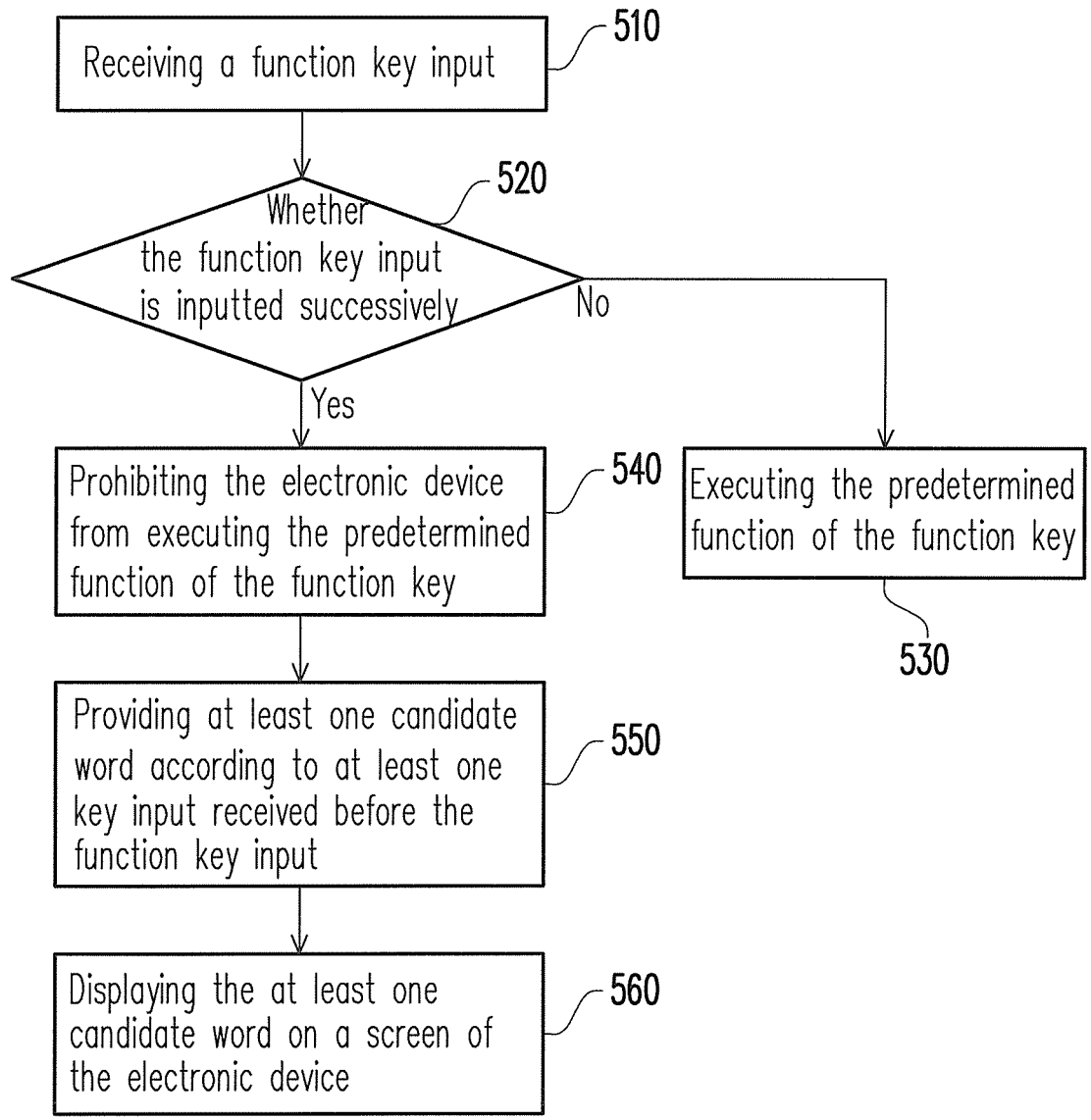
FIG. 5 is a flowchart illustrating an input method for an electronic device according to still another example of the present application.

FIG. 5 is a flowchart illustrating an input method for an electronic device according to still another example of the present application. Steps 510-540 in FIG. 5 are similar to steps 310-340 in FIG. 3, and the differences between the two examples is that in step 550, the determining module 120 provides one or more candidate words according to at least one key input received before the function key input. Then in step 560, the determining module 120 controls the executing module 130 to display the candidate words on a screen 140, so that the user may directly select a demanded word from the candidate words.

Taking the SIP 400 shown in FIG. 4 as an example, if the user presses the delete key 410 at the touch point $TP_1$ right after inputting characters "w" and "e" (i.e., a successive input operation), the determining module 120 may provide the word "welcome", "well", or other words starting with "wet" as the candidate words by referring an English word-database. The executing module 130 then displays the candidate words on the screen 140 for user to select.

It should be noted that, once the electronic device 100 determines that the user has pressed the function key during a successive input operation, a correction mechanism is performed to deal with the incorrect input of the function key. However, the operation of the correction mechanism is optional in the present application.

In another embodiment, whether the electronic device 100 is in an editing mode may be set according to a type of the key input received by the input module 110. To be specific, when the input module 110 receives the character key input (i.e. the inputted key is related to an alphabet, a numeral, or a symbol), the electronic device 100 is set to be in the editing mode. However, when the input module 110 receives the function key input, the electronic device 100 is set to be in a non-editing mode. Only when the input module 110 receives the function key input while the electronic device 100 is presently in the editing mode, the determining module 120 then determines whether the user presses the function key unintentionally or not, and accordingly controls the executing module 130 to prohibit or allow the execution of the predetermined function corresponding to the function key.

The present application further provides a computer-readable medium for storing a computer program, which is used to execute the input method for an electronic device which is having a function key corresponding to a predetermined function. Basically, the computer program is assembled by a plurality of program codes. Moreover, after the plurality of program codes are loaded into the electronic device and executed, the steps of the foregoing input method can be accomplished.

In summary, according to the examples of the present application, if it is determined that the user inputs a function key unintentionally, the electronic device is prohibited from executing the predetermined function of the function key. Instead, an alternative character is outputted on the screen, or the candidate words may be displayed on the screen for user to select. As a result, the purpose of facilitating the input operation of the electronic device can be achieved.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An input method for an electronic device, wherein the electronic device has a function key corresponding to a predetermined function, the method comprising:
   receiving a function key input of the function key after a previous key input is received, wherein the previous key input is different from the function key input;
   recording a reception time of the function key input and a reception time of the previous key input;
   determining whether the function key input is inputted successively according to a time interval between the reception time of the function key input and the reception time of the previous key input; and
   prohibiting the electronic device from executing the predetermined function if the function key input is inputted successively.

2. The method of claim 1, wherein the function key input is received through a software input panel (SIP) of the electronic device.

3. The method of claim 2, further comprising:
   determining an alternative key according to location coordinates of the function key input and a key layout of the SIP; and
   outputting a character relevant to the alternative key on a screen of the electronic device.

4. The method of claim 1, further comprising:
   providing at least one candidate word according to at least one key input received before the function key input; and
   displaying the at least one candidate word on a screen of the electronic device.

5. The method of claim 1, wherein the previous key input is last key input of the function key input.

6. The method of claim 1, wherein the function key comprises a delete key and/or a shift key.

7. An electronic device with a function key corresponding to a predetermined function, the electronic device comprising:
   an input module, configured to receive a function key input of the function key after a previous key input is received, and record a reception time of the function key input and a reception time of the previous key input, wherein the previous key input is different from the function key input;
   a determining module, coupled to the input module, wherein the determining module is configured to determine whether the function key input received by the input module is inputted successively according to a time interval between the reception time of the function key input and the reception time of the previous key input; and
   an executing module, coupled to the determining module, wherein the executing module is configured to prohibit the electronic device from executing the predetermined function if the determining module determines the function key input is inputted successively.

8. The electronic device of claim 7, wherein the input module provides a SIP and receives the function key input through the SIP.

9. The electronic device of claim 8, wherein the determining module determines an alternative key according to location coordinates of the function key input and a key layout of the SIP, and controls the executing module to output a character relevant to the alternative key on a screen of the electronic device.

10. The electronic device of claim 7, wherein the determining module provides at least one candidate word according to at least one key input received before the function key input, and controls the executing module to display the at least one candidate word on a screen of the electronic device.

11. The electronic device of claim 7, wherein the time interval is a difference between the reception time of the function key input and the reception time of the previous key input.

12. The electronic device of claim 7, wherein the function key comprises a delete key and/or a shift key.

13. A computer-readable medium storing a computer program, which, when executed in an electronic device, cause the electronic device to perform the operations of:
  receiving a function key input of a function key of the electronic device after a previous key input is received, wherein the function key corresponding to a predetermined function, and the previous key input is different from the function key input;
  recording a reception time of the function key input and a reception time of the previous key input;
  determining whether the function key input is inputted successively according to a time interval between the reception time of the function key input and the reception time of the previous key input; and
  prohibiting the electronic device from executing the predetermined function if the function key input is inputted successively.

14. The computer-readable medium of claim 13, wherein the function key input is received through a software input panel (SIP) of the electronic device, and comprises:
  determining an alternative key according to location coordinates of the function key input and a key layout of the SIP; and
  outputting a character relevant to the alternative key on a screen of the electronic device.

15. The computer-readable medium of claim 13, further comprising:
  providing at least one candidate word according to at least one key input received before the function key input; and
  displaying the at least one candidate word on a screen of the electronic device.

16. The computer-readable medium of claim 13, wherein the previous key input is last key input of the function key input.

17. The computer-readable medium of claim 13, wherein the function key comprises a delete key and/or a shift key.

* * * * *